US010037399B2

(12) United States Patent
Fukaya

(10) Patent No.: US 10,037,399 B2
(45) Date of Patent: Jul. 31, 2018

(54) CELL LIBRARY AND DATA FOR DESIGNS

(71) Applicant: Synaptics Japan GK, Tokyo (JP)

(72) Inventor: Tomohiro Fukaya, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 19 days.

(21) Appl. No.: 15/222,438

(22) Filed: Jul. 28, 2016

(65) Prior Publication Data

US 2017/0039312 A1 Feb. 9, 2017

(30) Foreign Application Priority Data

Aug. 7, 2015 (JP) ................................. 2015-157290

(51) Int. Cl.
 G06F 17/00 (2006.01)
 G06F 17/50 (2006.01)
(52) U.S. Cl.
 CPC ........ G06F 17/5077 (2013.01); G06F 17/505 (2013.01); *G06F 2217/78* (2013.01); *Y02E 60/76* (2013.01); *Y04S 40/22* (2013.01)
(58) Field of Classification Search
 USPC ......................................................... 716/127
 See application file for complete search history.

(56) References Cited

U.S. PATENT DOCUMENTS

| | | | | |
|---|---|---|---|---|
| 2004/0049755 A1* | 3/2004 | Nonaka | ............... | G06F 17/5068 257/288 |
| 2005/0160391 A1* | 7/2005 | Orita | .................. | G06F 17/5022 326/80 |
| 2007/0180419 A1* | 8/2007 | Sherlekar | ............ | G06F 17/5077 716/55 |
| 2011/0272782 A1* | 11/2011 | Yang | .................... | G06F 17/5068 257/532 |
| 2013/0049807 A1* | 2/2013 | Yang | ................ | H03K 3/356156 326/80 |

FOREIGN PATENT DOCUMENTS

JP H09-199600 A 7/1997

* cited by examiner

*Primary Examiner* — Mohammed Alam
(74) *Attorney, Agent, or Firm* — Patterson + Sheridan, LLP

(57) ABSTRACT

A cell library readable by a computer device includes cell data of a power supply reinforcement cell, specifying a conductive path that connects high-potential power supply routings located on both sides of one low-potential power supply routing with the routing interposed therebetween or low-potential power supply routings located on both sides of one high-potential power supply routing with the routing interposed therebetween, in data of plural cells which is used in designs of a semiconductor device including plural high-potential power supply routings, connected to a high-potential power supply trunk, which are separated from each other and are placed in parallel with each other, plural low-potential power supply routings, connected to a low-potential power supply trunk, which are placed alternately and in parallel with the high-potential power supply routings, and functional circuits which are formed in regions located between the high-potential power supply routings and the low-potential power supply routings.

20 Claims, 18 Drawing Sheets

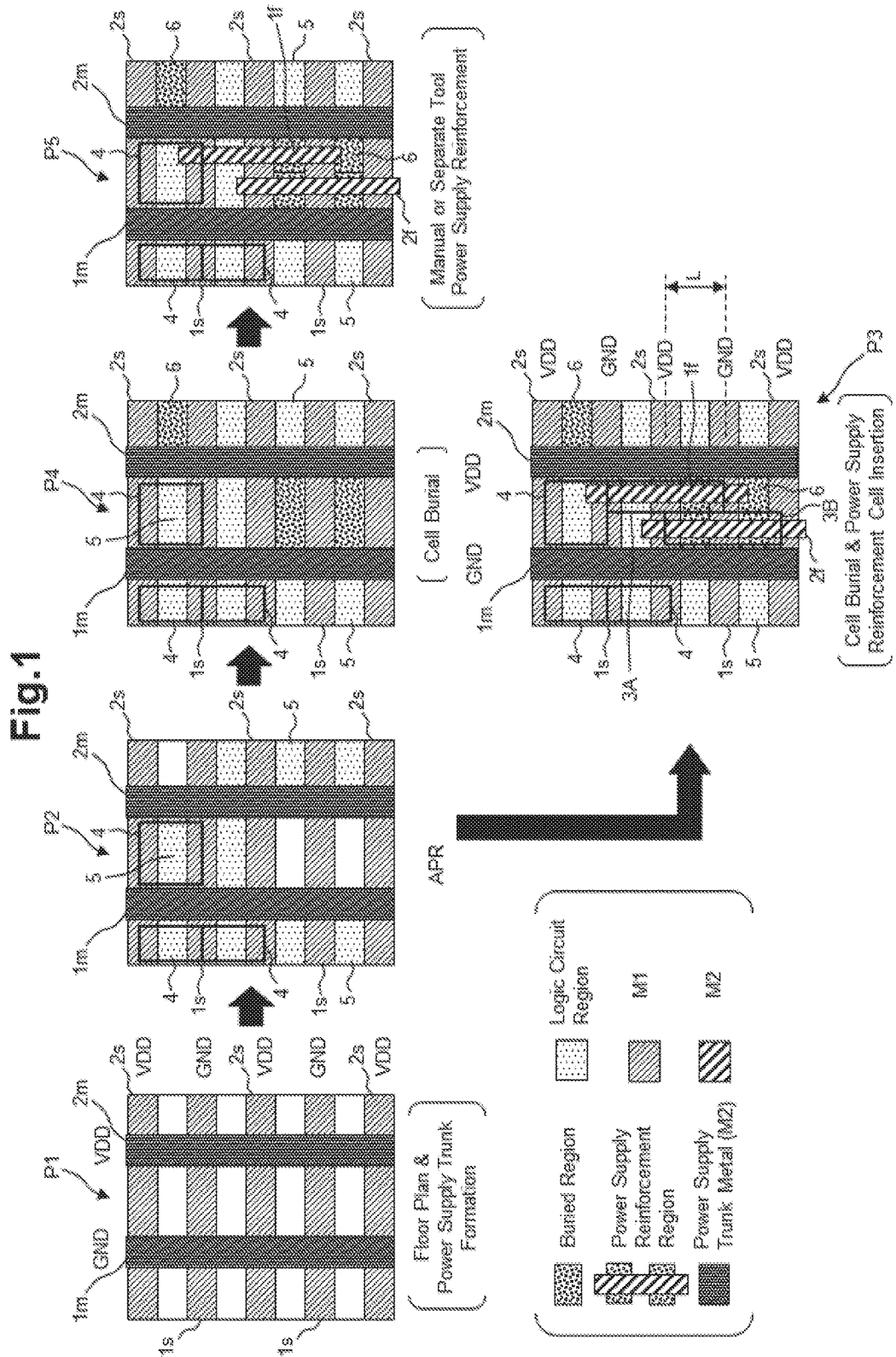

Fig.2

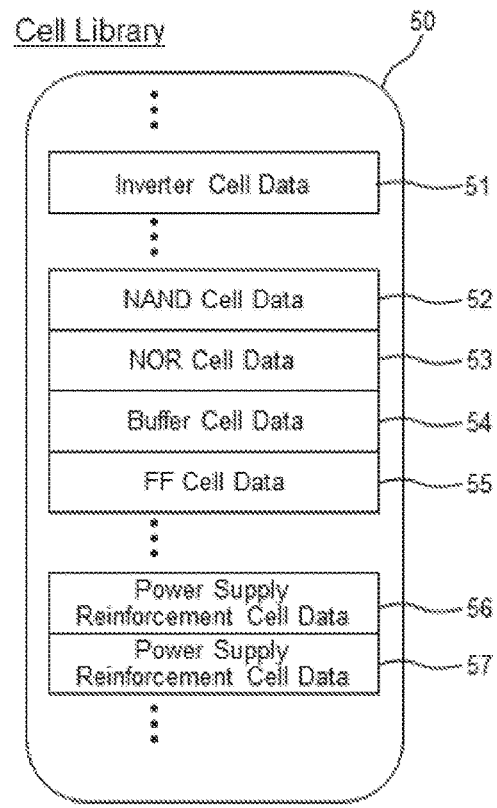

Cell Library — 50
- Inverter Cell Data — 51
- NAND Cell Data — 52
- NOR Cell Data — 53
- Buffer Cell Data — 54
- FF Cell Data — 55
- Power Supply Reinforcement Cell Data — 56
- Power Supply Reinforcement Cell Data — 57

Fig.3

Cell Data Structure

| | Content | Database |
|---|---|---|
| D1 | Logic Description Data | verilog |
| D2 | Layout Pattern Data | gds |
| D3 | RC Netlist | spice |
| D4 | Capacity and Current Consumption Data | apl |
| D5 | Input and Output Terminal Coordinates | |
| D6 | Other Parameters | |

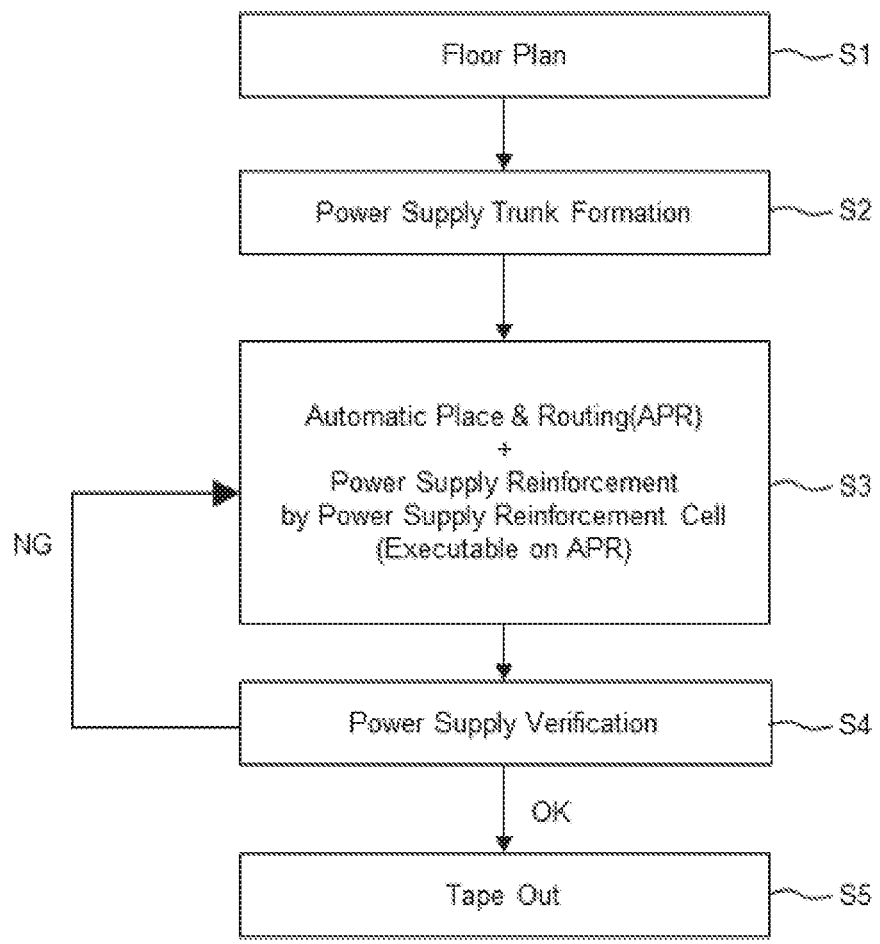

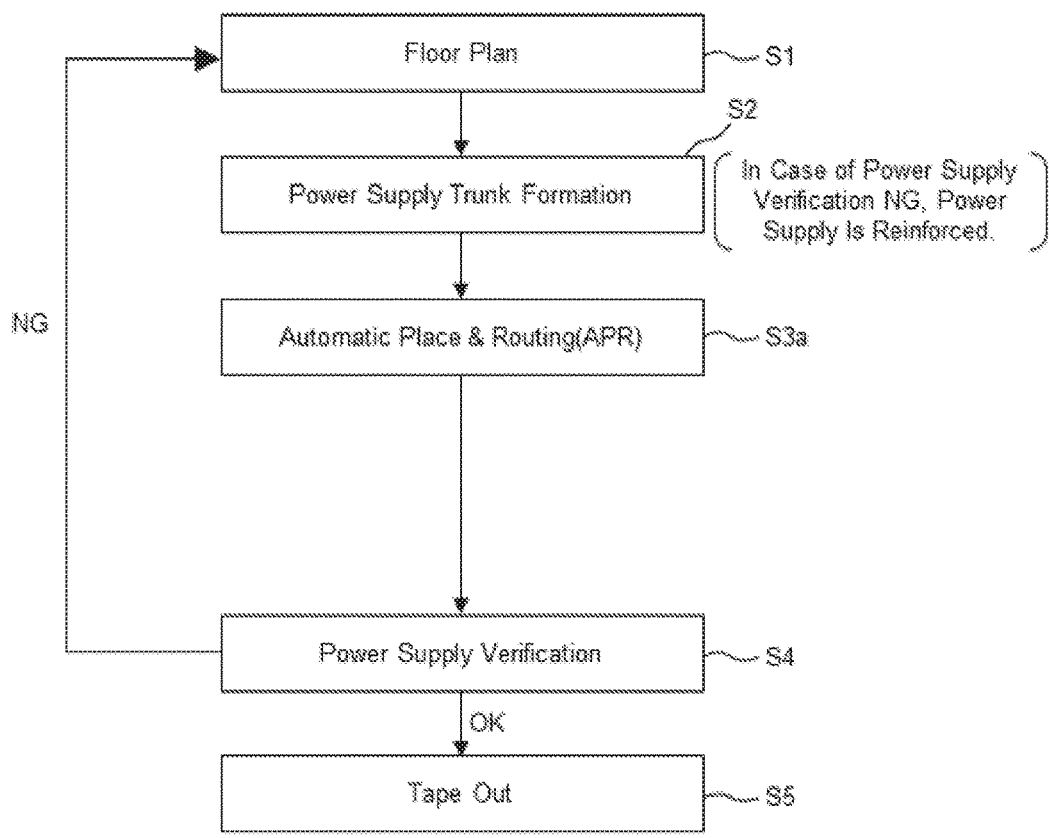

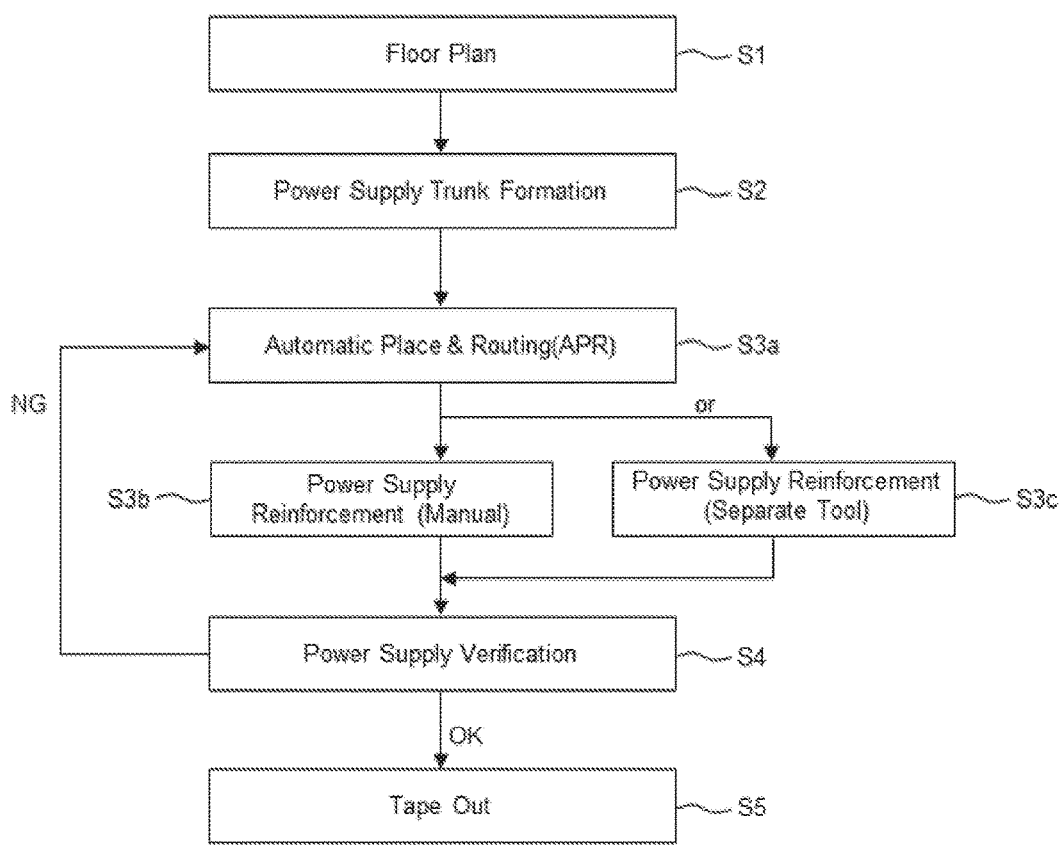

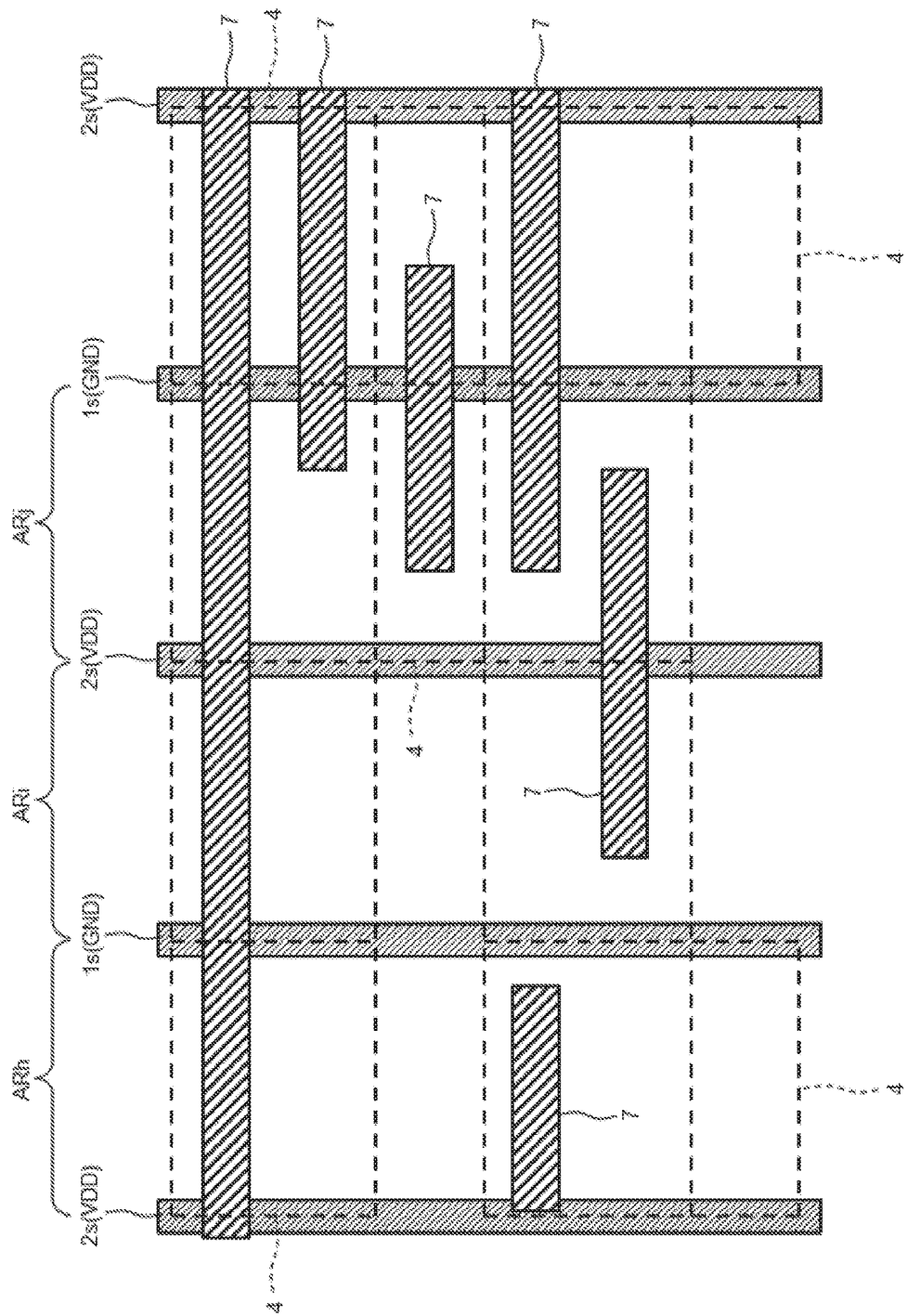

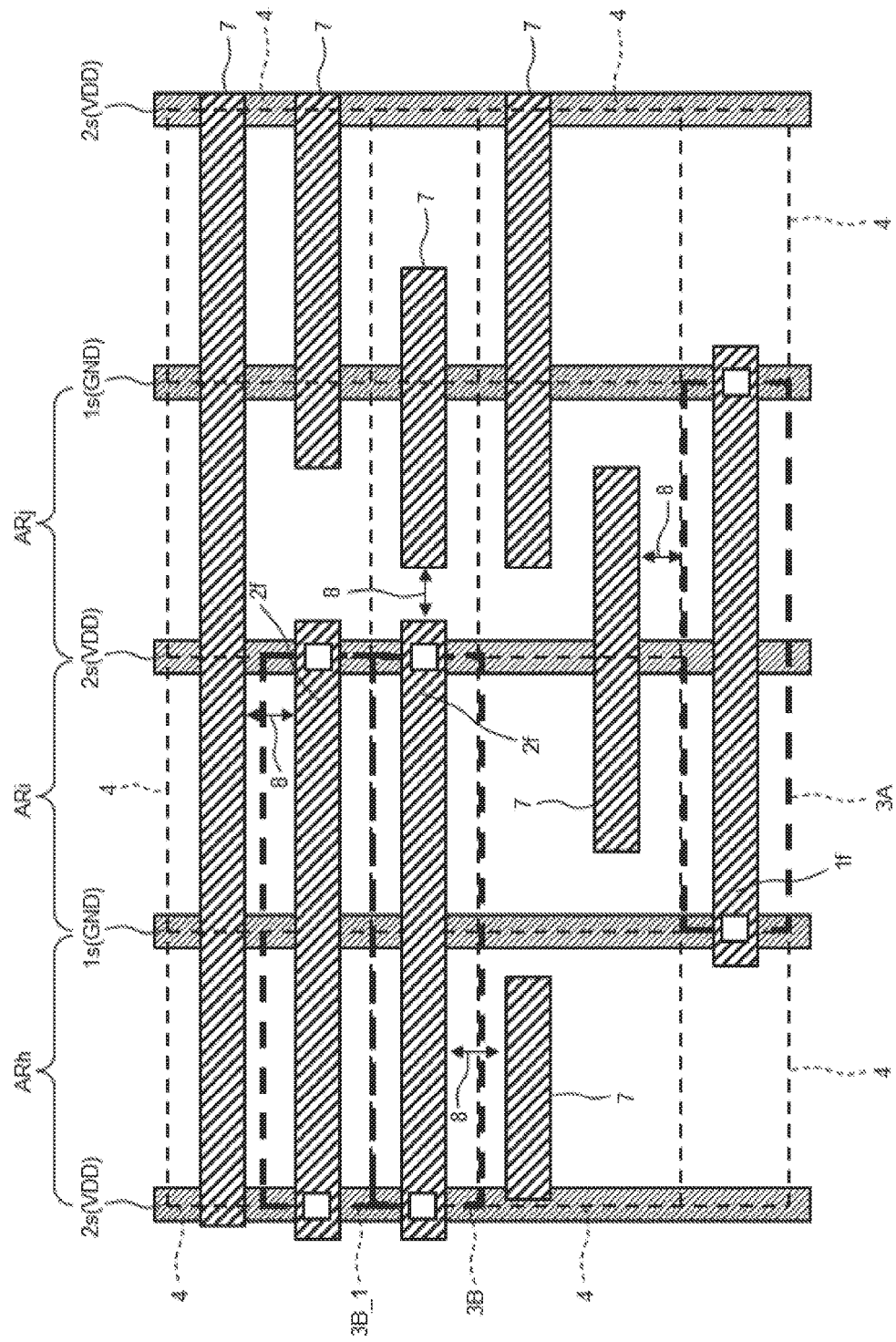

CELL LIBRARY AND DATA FOR DESIGNS

CROSS-REFERENCE TO RELATED APPLICATIONS

The Present application claims priority from Japanese application JP 2015-157290 filed on Aug. 7, 2015, the content of which is hereby incorporated by reference into this application.

BACKGROUND

The invention relates to a cell library readable by a computer device having a plurality of pieces of cell data prepared therein which are used in designs of a semiconductor device, and data for designs readable by a computer device which is used in designs of a semiconductor device, and relates to, for example, a technique effective in a case of application to design facilitation for power supply reinforcement.

A technique for the design facilitation of a semiconductor integrated circuit includes a design method of realizing a semiconductor integrated circuit that satisfies a desired logic function using a library of a plurality of functional cells which are previously designed and verified, and a method called, for example, a standard cell method. In many cases, cells normally have logic functions of a simple logic gate, a flip-flop or the like, and geometrically have shapes of which the heights are constant and the widths are variable. A power supply trunk is placed in accordance with a floor plan in advance of the placement of cells, and then the cells are placed. Thereby, various functional circuits are placed in, for example, regions between high-potential power supply routings and low-potential power supply routings. Each high-potential power supply routing and each low-potential power supply routing are connected to the power supply trunk which is previously placed. The functional circuits are supplied with an operating power supply using the high-potential power supply routing and the low-potential power supply routing, and the functional circuits are desirably connected to each other by signal routings for realizing required logic functions between columns or between rows. Required logic simulations or circuit simulations are performed on such an automatic placement and routing result, and functions or characteristics of the system thereof are evaluated. The system is partially corrected in case that required functions or characteristics are not satisfied, and placement and routing are redone from the beginning in case that the correction is inefficient.

Regarding the supply of operating power from the power supply trunk to each high-potential power supply routing and each low-potential power supply routing, at which position the power supply trunk is connected to each high-potential power supply routing and each low-potential power supply routing may be determined in advance in accordance with the power consumption of the functional circuit, or the like. In case that an undesired power supply drop or the like is caused in power supply verification, it maybe possible to cope with the power supply drop by performing automatic placement and routing again, but it is possible to cope therewith manually or by adding a power supply reinforcement process using a separate tool, without changing a layout.

JP-A-9-199600 discloses a power supply reinforcement process for a clock buffer. For example, a technique is disclosed in which functional circuits including a reinforcing power supply routing and a reinforcing ground routing are prepared in advance, as functional circuits such as the clock buffer available to a designer, a functional circuit used in a circuit portion having large power consumption is selected from simulation results, and the selected circuit is replaced with the functional circuit including a reinforcing power supply routing and a reinforcing ground routing. The reinforcing power supply routing draws a current from a high-potential power supply routing of a neighboring column, and the reinforcing ground routing causes a current to flow to a low-potential power supply routing of a neighboring column. Thereby, it is possible to reduce additional man-hours.

SUMMARY

The inventor has examined a power supply reinforcement process is efficiently performed without changing a layout after automatic placement and routing.

According to this, in case that the functional circuit including a reinforcing power supply routing and a reinforcing ground routing as a kind of functional circuit is added to the functional circuit such as the clock buffer as in JP-A-9-199600, a functional circuit capable of reinforcing a power supply system has to be added for each type of functional circuit. Thereby, there is a problem, in that the type of functional circuit such as a standard cell increases, and that the amount of data for designs like a cell library becomes excessively large. In addition, the functional circuit capable of reinforcing a power supply system disclosed in JP-A-9-199600 can be connected to the power supply routing or the ground routing of a front or rear functional circuit column, the reinforcing power supply routing draws a current from a high-potential power supply routing of a neighboring column, and the reinforcing ground routing causes a current to flow to a low-potential power supply routing of a neighboring column. This is based on the premise of a layout having a power supply path adopted therein in which a high-potential power supply routing is placed for each functional circuit column along the upper side of the column, and a low-potential power supply routing such as the ground routing is placed along the lower side thereof. Therefore, the technique disclosed in JP-A-9-199600 is not able to be applied to a layout in which the high-potential power supply routing and the low-potential power supply routing are placed alternately and in parallel with each other, and the high-potential power supply side and the low-potential power supply side are replaced with each other between the functional circuit columns adjacent to each other. The power supply side has to be connected to the high-potential power supply routing or the low-potential power supply routing of a neighboring functional circuit column across the circuit column. Therefore, even in case that the functional circuit including a reinforcing power supply routing and a reinforcing ground routing as disclosed in JP-A-9-199600 is prepared in advance, a case does not occur in which the process of power supply reinforcement is completed simply by replacing the functional circuit, as necessary, with a functional circuit for power supply reinforcement, and a process of expanding the reinforcing power supply routing and the reinforcing ground routing has to be newly added.

An object of the invention is to provide a cell library for power supply reinforcement or data for designs which is capable of contributing to the efficiency of a power supply reinforcement process even in case that a layout of a power supply system having a high-potential power supply routing and a low-potential power supply routing alternately placed therein is adopted, and which does not drastically increase the amount of cell data.

The above and other objects and novel features of the invention will be made clearer from the description and the accompanying drawings of the present specification.

The following is a brief description of the summary of the representative embodiments of the invention disclosed in the present application. Meanwhile, reference numerals and signs within the drawings and the like which are written in parentheses in the present items are an example for making the content easier to understand.

[1] Cell Library Having Power Supply Reinforcement Cell

A cell library (50) readable by a computer device has cell data of a plurality of cells (4, 3A, 3B, . . . ) prepared therein which are used in designs of a semiconductor device including in a semiconductor substrate: a plurality of high-potential power supply routings (2s), connected to a high-potential power supply trunk (2m), which are separated from each other and are placed in parallel with each other; a plurality of low-potential power supply routings (1s), connected to a low-potential power supply trunk (1m), which are placed alternately and in parallel with the high-potential power supply routings; and functional circuits (5) which are formed in regions located between the high-potential power supply routings and the low-potential power supply routings. The cell library includes cell data (56, 57) of a power supply reinforcement cell (3A, 3B, 3A_1, 3B_1, 3A_2, 3B_2, 3A_3, 3B_3) for specifying a conductive path that connects the high-potential power supply routings located on both sides of one of the low-potential power supply routings with the low-potential power supply routing interposed therebetween, or the low-potential power supply routings located on both sides of one of the high-potential power supply routings with the high-potential power supply routing interposed therebetween.

According to this, since the power supply reinforcement cell constitutes separate cells disconnected from the functional circuit, a cell for power supply reinforcement is not required to be prepared for each type of functional circuit, and a case does not occur in which the data capacity of the cell library remarkably increases due to the power supply reinforcement cell. Further, the power supply reinforcement cell specifies a conductive path that connects the high-potential power supply routings located on both sides of one of the low-potential power supply routings with the low-potential power supply routing interposed therebetween, or the low-potential power supply routings located on both sides of one of the high-potential power supply routings with the high-potential power supply routing interposed therebetween, and thus can be applied to power supply reinforcement for the array of the power supply routings having the high-potential power supply routing and the low-potential power supply routing alternately placed in parallel with each other. The power supply reinforcement cell may be placed at a proper position by automatic placement and routing from the beginning by previously estimating the power consumption of the functional circuit, and the power supply reinforcement cell may additionally be placed at a required position on the basis of the evaluation of a voltage drop or the like with respect to an automatic placement and routing result.

[2] Power Supply Reinforcement Cell Having Two-Fold Height

In item 1, the power supply reinforcement cell (3A, 3B, 3A_1, 3B_1) has a required width and a height which is equivalent to twice a distance between the high-potential power supply routing and the low-potential power supply routing which are adjacent to each other, when seen in a plan view.

According to this, in case that the power supply reinforcement cell is inserted into the array of the power supply routings having the high-potential power supply routing and the low-potential power supply routing alternately placed in parallel with each other, the high-potential power supply or the low-potential power supply can be fetched across an neighboring functional circuit column.

[3] Power Supply Reinforcement Cell Leading to Well Power-Feeding Region

In item 2, the power supply reinforcement cell (3A(3B)) specifies a first power-feeding region (20(21)) which is provided in a first well (10(11)) of a first conductivity type, a first via (30a, 30b(31a, 31b)) that leads from the first power-feeding region through connection to a power supply routing (1s(2s)) of any one polarity within the low-potential power supply routing or the high-potential power supply routing to an upper routing layer thereof, a second power-feeding region (20(21)) which is provided in a second well (10(11)) of a first conductivity type formed with a well of a second conductivity type next to the first well interposed therebetween, a second via (30a, 30b(31a, 31b)) that leads from the second power-feeding region through connection to a separate power supply routing (1s(2s)) of the one polarity to an upper routing layer thereof, and a power supply reinforcement routing (1f(2f)) of the one polarity which connects the first via and the second via.

Such a configuration is suitable for a case where power supply reinforcement associated with well power-feeding is performed on an empty cell frame having no functional circuit formed therein.

[4] Power Supply Reinforcement Cell for High-Potential Power Supply

In item 3, the first conductivity type is an N-type, the second conductivity type is a P-type, and the power supply routing of the one polarity is a high-potential power supply routing (FIGS. 9 and 10).

Such a configuration is suitable for the reinforcement of the high-potential power supply.

[5] Power Supply Reinforcement Cell for Low-Potential Power Supply

In item 3, the first conductivity type is a P-type, the second conductivity type is an N-type, and the power supply routing of the one polarity is a low-potential power supply routing (FIGS. 7 and 8).

Such a configuration is suitable for the reinforcement of the low-potential power supply.

[6] Power Supply Reinforcement Cell Having No Well Power-Feeding Region

In item 2, the power supply reinforcement cell (3A_1 (3B_1)) specifies a first via (30b(31b)), connected to a power supply routing (1s(2s)) of any one polarity within a low-potential power supply routing or a high-potential power supply routing, which leads to an upper routing layer thereof, a second via (30b(31b)), connected to a neighboring power supply routing of the same polarity as that of the power supply routing having the first via connected thereto, which leads to an upper routing layer thereof, and a power supply reinforcement routing (1f(2f)) of the one polarity which connects the first via and the second via.

Such a configuration is suitable for a case where power supply reinforcement is performed by causing the power supply reinforcement cell to overlap a cell frame having the functional circuit formed therein.

[7] Power Supply Reinforcement Cell for High-Potential Power Supply

In item 6, the first conductivity type is an N-type, the second conductivity type is a P-type, and the power supply routing of the one polarity is a high-potential power supply routing (FIG. 13).

Such a configuration is suitable for the reinforcement of the high-potential power supply.

[8] Power Supply Reinforcement Cell for Low-Potential Power Supply

In item 6, the first conductivity type is a P-type, the second conductivity type is an N-type, and the power supply routing of the one polarity is a low-potential power supply routing (FIG. 12).

Such a configuration is suitable for the reinforcement of the low-potential power supply.

[9] Power Supply Reinforcement Cell Having One-Fold Height

In item 1, the power supply reinforcement cell (3A_2, 3B_2, 3A_3, 3B_3) has a required width and a height which is equivalent to a distance between the high-potential power supply routing (2s) and the low-potential power supply routing (1s) which are adjacent to each other, when seen in a plan view, and is configured such that line-symmetric placement is performed with two cells used as one set, to thereby specify a conductive path that connects the high-potential power supply routings located on both sides of one of the low-potential power supply routings with the low-potential power supply routing interposed therebetween, or the low-potential power supply routings located on both sides of one of the high-potential power supply routings with the high-potential power supply routing interposed therebetween. (FIGS. 14 and 16).

According to this, the amount of cell data of the power supply reinforcement cell included in the cell library is reduced by half as compared to that in item 2, and thus it is possible to obtain the same operational effect as that in item 2.

[10] Power Supply Reinforcement Cell Leading to Well Power-Feeding Region

In item 9, the power supply reinforcement cell (3A_2 (3B_2)) specifies a first power-feeding region (20(21)) which is provided in a first well (10(11)) of a first conductivity type, a first via (30a, 30b(31a, 31b)) that leads from the first power-feeding region through connection to a power supply routing (1s(2s)) of any one polarity within the low-potential power supply routing or the high-potential power supply routing to an upper routing layer thereof, and a power supply reinforcement routing (1fh(2fh)) of the one polarity which is connected to the first via.

Such a configuration is suitable for a case where power supply reinforcement associated with well power-feeding is performed on an empty cell frame having no functional circuit formed therein.

[11] Power Supply Reinforcement Cell for High-Potential Power Supply

In item 10, the first conductivity type is an N-type, and the power supply routing of the one polarity is a high-potential power supply routing (FIGS. 16 and 17).

Such a configuration is suitable for the reinforcement of the high-potential power supply.

[12] Power Supply Reinforcement Cell for Low-Potential Power Supply

In item 10, the first conductivity type is a P-type, and the power supply routing of the one polarity is a low-potential power supply routing (FIGS. 14 and 15).

Such a configuration is suitable for the reinforcement of the low-potential power supply.

[13] Power Supply Reinforcement Cell Having No Well Power-Feeding Region

In item 9, the power supply reinforcement cell (3A_3 (3B_3)) specifies a first via (30b(31b)), connected to a power supply routing (1s(2s)) of any one polarity within a low-potential power supply routing or a high-potential power supply routing, which leads to an upper routing layer thereof, and a power supply reinforcement routing (1fh(2fh)) of the one polarity which is connected to the first via.

Such a configuration is suitable for a case where power supply reinforcement is performed by causing the power supply reinforcement cell to overlap a cell frame having the functional circuit formed therein

[14] Power Supply Reinforcement Cell for High-Potential Power Supply

In item 13, the first conductivity type is an N-type, and the power supply routing of the one polarity is a high-potential power supply routing (FIG. 19).

Such a configuration is suitable for the reinforcement of the high-potential power supply.

[15] Power Supply Reinforcement Cell for Low-Potential Power Supply

In item 13, the first conductivity type is a P-type, and the power supply routing of the one polarity is a low-potential power supply routing (FIG. 18).

Such a configuration is suitable for the reinforcement of the low-potential power supply.

[16] Data for Designs Including Cell Data of Power Supply Reinforcement Cell Having Two-Fold Height Data for designs readable by a computer device is data which is used in designs of a semiconductor device including in a semiconductor substrate: a plurality of high-potential power supply routings (2s), connected to a high-potential power supply trunk (2m), which are separated from each other and are placed in parallel with each other; a plurality of low-potential power supply routings (1s), connected to a low-potential power supply trunk (1m), which are placed alternately and in parallel with the high-potential power supply routings; and functional circuits (5) which are formed in regions located between the high-potential power supply routings and the low-potential power supply routings. The data for designs includes cell data (56, 57) of a power supply reinforcement cell (3A, 3B, 3A_1, 3B_1) which has a required width and a height which is equivalent to twice a distance between the high-potential power supply routing (2s) and the low-potential power supply routing (1s) adjacent to each other, when seen in a plan view, and specifies a conductive path that connects the high-potential power supply routings located on both sides of one of the low-potential power supply routings with the low-potential power supply routing interposed therebetween, or the low-potential power supply routings located on both sides of one of the high-potential power supply routings with the high-potential power supply routing interposed therebetween.

According to this, since the power supply reinforcement cell constitutes separate cells disconnected from the functional circuit, a cell for power supply reinforcement is not required to be prepared for each type of functional circuit, and a case does not occur in which the capacity of data for designs remarkably increases due to the power supply reinforcement cell. Further, the power supply reinforcement cell specifies a conductive path that connects the high-potential power supply routings located on both sides of one of the low-potential power supply routings with the low-potential power supply routing interposed therebetween, or the low-potential power supply routings located on both sides of one of the high-potential power supply routings with the high-potential power supply routing interposed therebetween, and thus can be applied to power supply reinforcement for the array of the power supply routings having the high-potential power supply routing and the low-potential power supply routing alternately placed in parallel with each other. Further, in case that the power supply reinforcement cell is inserted into the array of the power supply routings having the high-potential power supply routing and the low-potential power supply routing alternately placed in parallel with each other, the high-potential power supply or the low-potential power supply can be fetched across an neighboring functional circuit column.

[17] Data for Designs Including Cell Data of Power Supply Reinforcement Cell Having One-Fold Height Data for designs readable by a computer device is data which is used in designs of a semiconductor device including in a semiconductor substrate: a plurality of high-potential power supply routings ($2s$), connected to a high-potential power supply trunk ($2m$), which are separated from each other and are placed in parallel with each other; a plurality of low-potential power supply routings ($1s$), connected to a low-potential power supply trunk ($1m$), which are placed alternately and in parallel with the high-potential power supply routings; and functional circuits (5) which are formed in regions located between the high-potential power supply routings and the low-potential power supply routings. The data for designs includes cell data (56, 57) of a power supply reinforcement cell (3A_2, 3B_2, 3A_3, 3B_3) that has a required width and a height which is equivalent to a distance between the high-potential power supply routing and the low-potential power supply routing which are adjacent to each other, when seen in a plan view, and is configured such that line-symmetric placement is performed with two cells used as one set, to thereby specify a conductive path that connects the high-potential power supply routings located on both sides of one of the low-potential power supply routings with the low-potential power supply routing interposed therebetween, or the low-potential power supply routings located on both sides of one of the high-potential power supply routings with the high-potential power supply routing interposed therebetween.

According to this, the amount of cell data of the power supply reinforcement cell included in the data for designs is reduced by half as compared to that in item 16, and thus it is possible to obtain the same operational effect as that in item 16.

The following is a brief description of an effect obtained by the representative embodiments of the invention disclosed in the present application.

That is, even in case that a layout of a power supply system having the high-potential power supply routing and the low-potential power supply routing alternately placed therein is adopted, it is possible to contribute to the efficiency of a power supply reinforcement process without drastically increasing the amount of cell data.

BRIEF DESCRIPTION OF THE DRAWINGS

FIG. 1 is a diagram schematically illustrating the significance of a power supply reinforcement cell which is provided in data for designs according to the invention.

FIG. 2 is a diagram illustrating an example of a cell library.

FIG. 3 is a diagram illustrating a data structure of cell data.

FIG. 4 is a flow diagram illustrating a power supply reinforcement method in case that processes P1, P2, and P3 are used.

FIG. 5 is a flow diagram illustrating a power supply reinforcement method according to a comparative example in which the power supply reinforcement cell is not used.

FIG. 6 is a flow diagram illustrating a power supply reinforcement method according to still another comparative example in which the power supply reinforcement cell is not used.

FIG. 20 is a plan view illustrating a state where functional cells are placed by automatic placement and routing.

FIG. 21 is a plan view illustrating a placement example of power supply reinforcement cells in case that power supply reinforcement is performed on a circuit portion having partially large power consumption in accordance with the result of the automatic placement and routing of FIG. 20.

DETAILED DESCRIPTION

Figure 7:
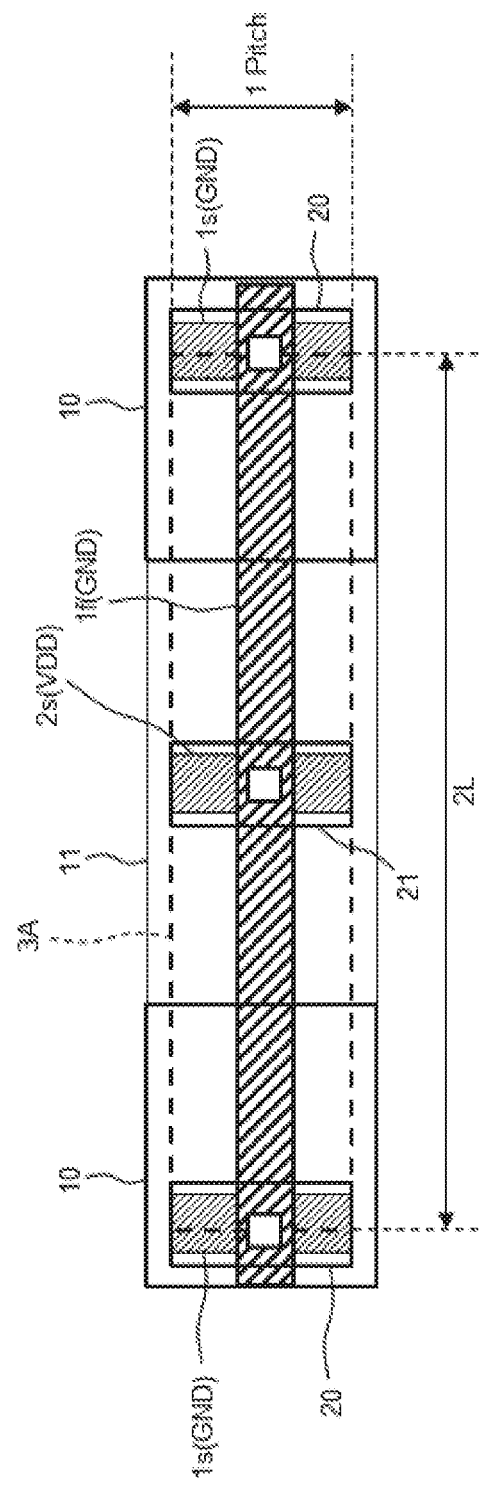
FIG. 7 is a plan view illustrating a planar configuration of a power supply reinforcement cell for a ground voltage GND having a height of 2L.

Power Supply Reinforcement Cell Used in Automatic Placement and Routing

FIG. 1 schematically illustrates the significance of a power supply reinforcement cell which is provided in data for designs according to the invention. Herein, design processes P1 to P5 of a semiconductor integrated circuit are shown by a planar pattern.

P1 schematically shows a floor plan of a semiconductor integrated circuit to be designed and a design process of a power supply trunk according thereto. In addition, $1m$ shows a low-potential power supply trunk (also simply called a ground trunk) used in the supply of low-potential power such as a ground voltage (GND), and $2m$ shows a high-potential power supply trunk (also simply called a power supply trunk) used in the supply of high-potential power such as a power supply voltage (VDD). A plurality of high-potential power supply routings (also simply called power supply routings) $2s$, connected to the power supply trunk $2m$, which are separated from each other and are placed in parallel with each other and a plurality of low-potential power supply routings (also simply called ground routings) $1s$, connected to the ground trunk $1m$, which are placed alternately and in parallel with the power supply routings $2s$ are placed in a direction intersecting the above trunks when seen in a plan view. Although not particularly limited, the power supply trunk $2m$ and the ground trunk $1m$ are placed in a second aluminum routing layer, and the power supply routing $2s$ and the ground routing is are placed in a first aluminum routing layer.

P2 schematically shows an automatic placement and routing process. Here, 5 is a functional circuit which is formed in a region located between the power supply routing $2s$ and the ground routing $1s$. In a cell library used in automatic placement and routing, cell data is registered as data for designs, which has logic functions of simple logic gates, flip-flops or the like and which geometrically has a shape with a constant height and a variable width, as a plurality of cells, which are previously designed and verified. In the automatic placement and routing, the placement and routing of cells are performed so as to satisfy a desired logic function by reading the cell library using an automatic placement and routing tool in accordance with the floor plan. The automatic placement and routing tool refers to a computer device that executes an automatic placement and routing program. In addition, 4 indicates a functional cell shown by the cell frame. Various functional circuits 5 are placed in, for example, a region located between the power supply routing $2s$ and the ground routing $1s$ by the automatic placement and routing. The power supply trunk $2m$ is connected to each of the power supply routings $2s$, and the ground trunk $1m$ is connected to each of the ground routings $1s$. The functional circuit 5 is supplied with an operating power supply using the power supply routing $2s$ and the ground routing $1s$, and a large number of functional circuits 5 arranged all over are desirably connected to each other by signal routings (not shown) for realizing a required logic function between columns or between rows. A region having functional circuits arranged all over serves as, for example, a logic circuit region, and an empty region having no functional circuit 5 or the like placed therein serves as a buried region 6 having a well or the like formed therein.

P4 means a cell burial process of forming the buried region 6 after the automatic placement and routing of P2. The cell burial process is performed as part of the automatic placement and routing. The wording "performed as part" means that the process is performed using the same automatic placement and routing tool as the automatic placement and routing tool.

A logic simulation or circuit simulation which is required is performed on the automatic placement and routing result, and the functions or characteristics of the entire system are evaluated. In case that the requirement specification of a power supply system is not satisfied due to the generation of a power supply voltage drop, the floating of a ground voltage, and the like, a power supply reinforcement process is performed.

In P5, a reinforcing power supply routing $2f$ or reinforcing ground routing $1f$ is properly placed manually or using a separate design tool, as a routing for power supply reinforcement, and the power supply reinforcement process is performed. Although not particularly limited, the reinforcing power supply routing $2f$ and the reinforcing ground routing $1f$ are placed on the second aluminum routing layer. The reinforcing ground routing $1f$ connects the ground routings $1s$ located on both sides of the power supply routing $2s$ with the power supply routing interposed therebetween, and a current is drawn out from one ground routing $1s$ through the reinforcing ground routing $1f$ to the other ground routing $1s$, thereby allowing the current drawing-out capability of the one ground routing $1s$ to be improved. Thereby, the undesired floating of a ground voltage in the one ground routing $1s$ is dissolved. In addition, a current is supplied from one power supply routing $2s$ through the reinforcing power supply routing $2f$ to the other power supply routing $2s$, and thus current supply capability from the other power supply routing $2s$ to the functional circuit 5 is improved. Thereby, the undesired drop of a power supply voltage in the other ground routing $1s$ is dissolved. The power supply reinforcement process which is performed in P5 is an additional process which is completely separated from a process of automatic placement and routing using the cell data of the cell library.

On the other hand, P3 subsequent to the process P2 schematically shows a power supply reinforcement process which is performed as part of the automatic placement and routing process using the cell data of the cell library. In this process P3, the burial of cells and the burial of required power supply reinforcement cells are performed instead of the processes P4 and P5.

In order to realize the process P3, cell data of power supply reinforcement cells is prepared for the cell library, in addition to cell data of various functional cells. The drawing shows an example in which power supply reinforcement cells 3A and 3B are placed, as an example. The power supply reinforcement cell 3B has a required width and a height 2L which is equivalent to twice a distance L between the power supply routing $2s$ and the ground routing $1s$ which are adjacent to each other, when seen in a plan view, and specifies a conductive path that connects the power supply routings $2s$ located on both sides of one ground routing $1s$ with the ground routing interposed therebetween. The power supply reinforcement cell 3A has the height 2L and a required width likewise, and specifies a conductive path that connects the ground routings is located on both sides of one power supply routing $2s$ with the power supply routing interposed therebetween.

The placement of the power supply reinforcement cells 3A and 3B may also be performed using an automatic placement and routing tool similarly to the placement of the functional cells 4, and where the power supply reinforcement cells are placed may be determined on the basis of an automatic placement and routing result or a simulation result for the result. Alternatively, the power supply reinforcement cells may be placed in required positions from the beginning by estimating the power consumption of a circuit realized by the functional cell. Then, it is possible to reduce the amount of addition of the power supply reinforcement cells 3A and 3B after the simulation for the automatic placement and routing result, and to further improve the efficiency of a process.

FIG. 2 shows an example of a cell library 50. The cell library 50 includes functional cell data pieces 51 to 55 according to various functional cells and power supply reinforcement cell data pieces 56 and 57 according to the power supply reinforcement cells 3A and 3B or the like which are data pieces for designs having a data format readable by an automatic placement and routing tool as a computer device. These data pieces are classified and arranged by, for example, predetermined index data, and are stored and provided in a recording medium such as an optical disc, a magnetic storage device, or a semiconductor non-volatile memory so as to be capable of being easily retrieved in a database format. The functional cell data pieces 51 to 55 serve as inverter cell data, NAND cell data, NOR cell data, buffer cell data, FF cell data, and the like. The power supply reinforcement cell data 56 serves as, for example, the cell data of the power supply reinforcement cell 3A, and the power supply reinforcement cell data 57 serves as, for example, the data of the power supply reinforcement cell 3B.

FIG. 3 illustrates a data structure of the cell data. Each of the cell data pieces 51 to 57 includes layout pattern data D2 and functional description data, and includes logic description data D1, RC netlist D3, capacity and current consumption data D4, input and output terminal coordinates D5, and other parameters D6, as the functional description data. The layout pattern data is constituted by, for example, data or the like such as planar pattern coordinates for specifying a structure leading from an active region to a routing layer. It is possible to use verilog as a logic description language of the logic description data D1, use gds as a description language of the layout pattern data D2, use spice as a description language of the RC netlist D3, and to use apl as a description language of the capacity and current consumption data D4.

FIG. 4 illustrates a flow diagram of a power supply reinforcement method in case that the processes P1, P2, and P3 are used. A floor plan is generated (S1), a power supply trunk is formed (S2), and power supply reinforcement by the power supply reinforcement cell is next performed together with automatic placement and routing. This power supply reinforcement is naturally executed by the automatic placement and routing. Power supply verification is performed on the result of the automatic placement and routing, that is, whether an undesired power supply drop or the floating of a ground is present or not is verified (S4). In case that there is a problem, the reinforcement by the power supply reinforcement cell is performed again. Finally, in case that there is no problem, the automatic placement and routing result is output (S5).

FIG. 5 illustrates a power supply reinforcement method according to a comparative example in which the power supply reinforcement cell is not used. Herein, in case that there is a problem in a power supply verification result for the automatic placement and routing result, the process goes back to the floor plan (S1) to redo the formation of the power supply trunk (S2), and the automatic placement and routing is redone again (S3a). Since the automatic placement and routing is redone from the beginning, the power supply reinforcement method of FIG. 5 is remarkably inefficient as compared to FIG. 4.

FIG. 6 illustrates a power supply reinforcement method according to still another comparative example in which the power supply reinforcement cell is not used. Herein, the power supply reinforcement is performed manually after the automatic placement and routing (S3b), or the power supply reinforcement is performed using a separate power supply reinforcement tool (S3c). Processes of steps S3b and S3c are equivalent to the process of the process P5 in FIG. 1. Thereafter, power supply verification for the automatic placement and routing and power supply reinforcement result is performed (S4). In a case that there is a problem in the result, the automatic placement and routing (S3a), the manual power supply reinforcement (S3b), and further the power supply reinforcement (S3c) using a separate power supply reinforcement tool are repeated again, and thus the power supply reinforcement method of FIG. 6 is remarkably inefficient as compared to FIG. 4.

Power Supply Reinforcement Cell Having Height of 2L and Well Power-Feeding

Figure 8:
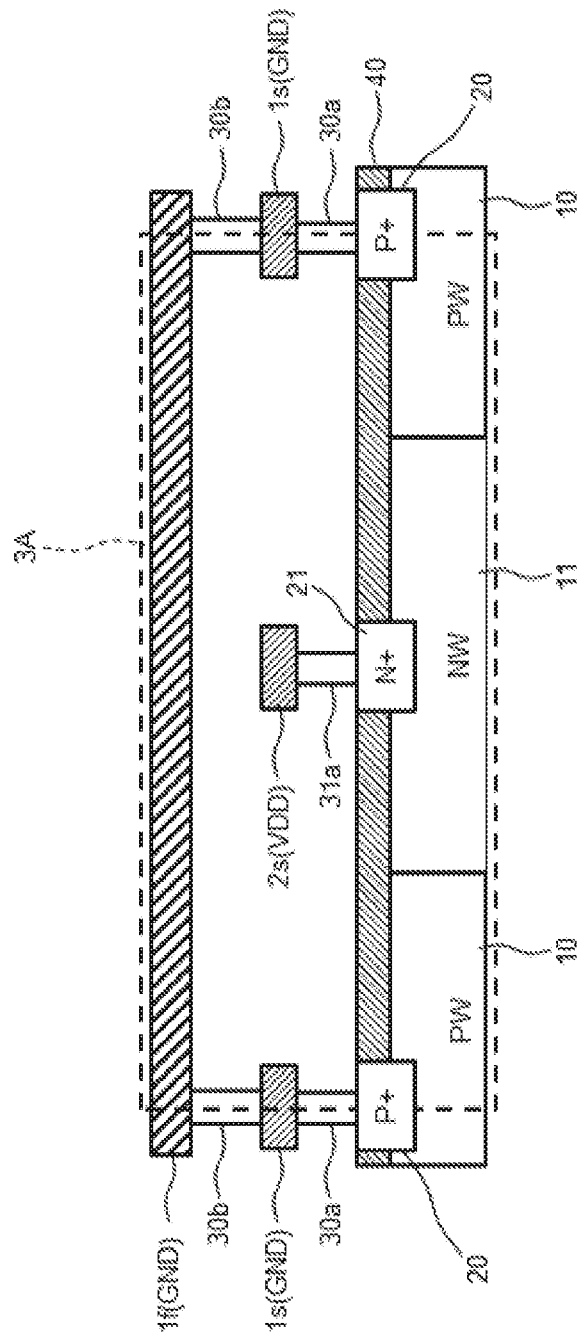
FIG. 8 is a cross-sectional view illustrating a longitudinal cross-sectional structure taken along the power supply reinforcement cell of FIG. 7.

FIG. 7 illustrates a planar configuration of a power supply reinforcement cell for a ground voltage GND having a height of 2L, and FIG. 8 illustrates a longitudinal cross-sectional structure taken along the power supply reinforcement cell. The longitudinal direction (transverse direction) of the plan view and the longitudinal cross-sectional view of power supply reinforcement cells shown in FIG. 7 and the subsequent drawings corresponds to the transverse direction (longitudinal direction) shown in FIG. 1.

The power supply reinforcement cell 3A illustrated in the drawing has a structure surrounded by a broken line. The width dimension of the ground routing 1s and the power supply routing 2s in a longitudinal direction when seen in a plan view is set to, for example, 1 pitch. Here, 1 pitch means the total width dimension of a minimum metal routing width and a space between metal routings. A height dimension in a direction running straight to the ground routing 1s and the power supply routing 2s is set to a height 2L twice a normal cell.

Active regions located between the ground routing 1s and the power supply routing 2s when seen in a plan view are configured such that the ground routing 1s side serves as a P-type well (PW) 10, and that the power supply routing 2s side serves as an N-type well (NW) 11. Herein, a P-type power-feeding region (P+) 20, an N-type power-feeding region (N+) 21, and a P-type power-feeding region 20 for feeding power to the wells 10, 11, and 10 next to each other, respectively, are placed. The P-type well 10 is a region which is formed by a P-type impurity such as boron being implanted into a silicon substrate, and the P-type power-feeding region 20 is a region which is formed by a P-type impurity being implanted at a higher concentration than that of the P-type well 10. The P-type power-feeding region 20 is connected to the ground routing 1s located directly thereabove through a via 30a, and the N-type power-feeding region 21 is connected to the power supply routing 2s located directly thereabove through a via 31a. A via 30b communicating with the via 30a is formed on the ground routing 1s, and the via 30b and the via 30b are connected to each other by the reinforce ground routing 1f. The surfaces of the wells 10 and 11 are covered with an oxide film 40.

Figure 9:
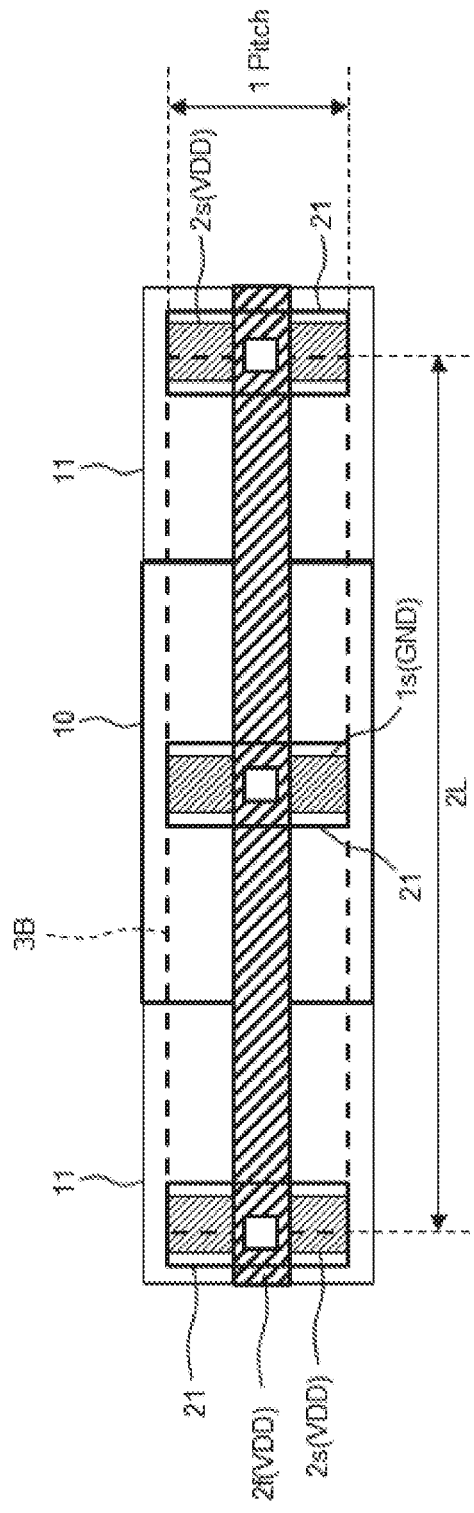
FIG. 9 is a plan view illustrating a planar configuration of a power supply reinforcement cell for a power supply voltage VDD having a height of 2L.
Figure 10:
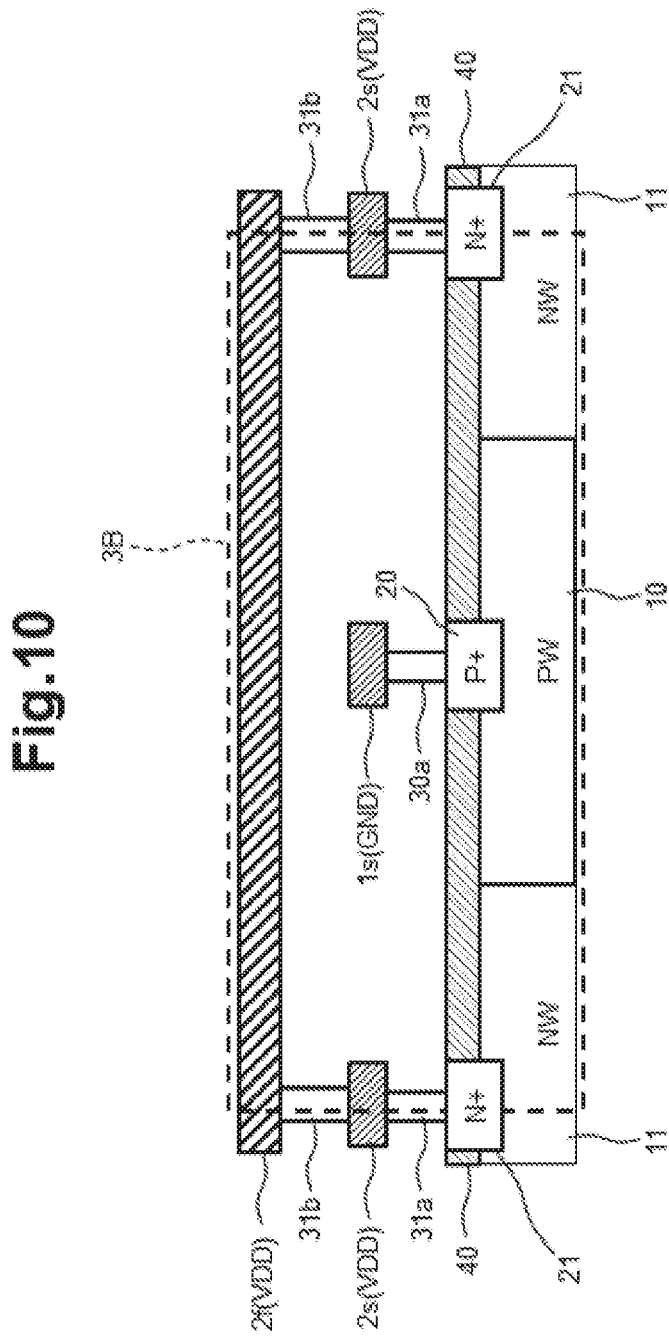
FIG. 10 is a cross-sectional view illustrating a longitudinal cross-sectional structure taken along the power supply reinforcement cell of FIG. 9.

FIG. 9 illustrates a planar configuration of a power supply reinforcement cell for a power supply voltage VDD having a height of 2L, and FIG. 10 illustrates a longitudinal cross-sectional structure taken along the power supply reinforcement cell.

Active regions located between the ground routing 1s and the power supply routing 2s when seen in a plan view are configured such that the ground routing 1s side serves as a P-type well (PW) 10, and that the power supply routing 2s side serves as an N-type well (NW) 11. Herein, an N-type power-feeding region (N+) 21, a P-type power-feeding region 20, and an N-type power-feeding region (N+) 21 for feeding power to the wells 11, 10, and 11 next to each other, respectively, are placed. The N-type power-feeding region 21 is connected to the power supply routing 2s located directly thereabove through a via 31a, and the P-type power-feeding region 20 is connected to the ground routing 1s located directly thereabove through a via 30a. A via 31b communicating with the via 31a is formed on the power supply routing 2s, and the via 31b and the via 31b next to each other are connected to each other by the reinforcing power supply routing 2f. The other components are the same as those in FIGS. 7 and 8, and thus the description thereof will not be given.

Figure 11:
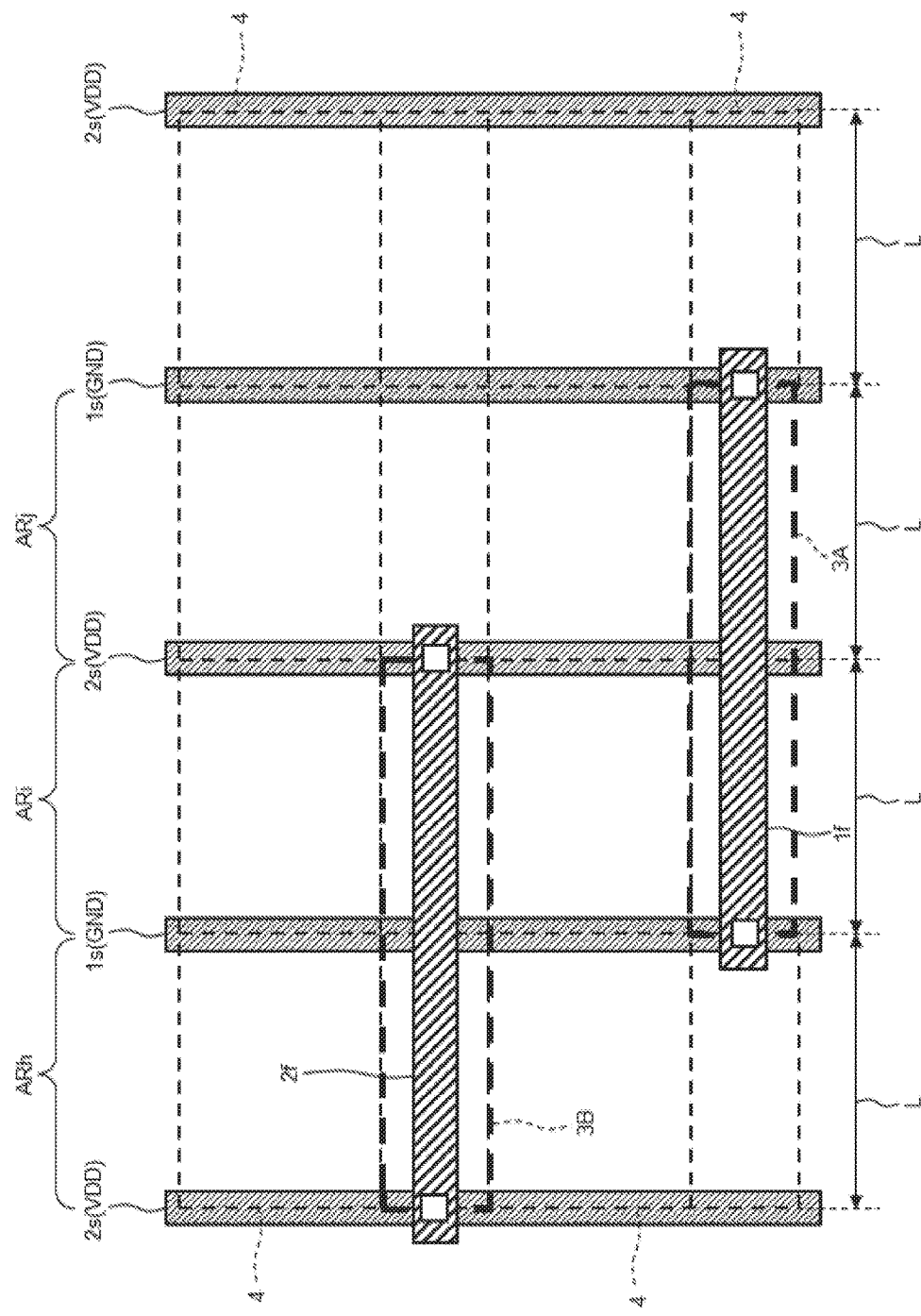
FIG. 11 is a plan view illustrating a placement example of the power supply reinforcement cells shown in FIGS. 7 and 9.

FIG. 11 shows a placement example of the power supply reinforcement cells 3A and 3B. In FIG. 11, appropriate functional cells 4 are placed in portions other than regions having the power supply reinforcement cells 3A and 3B placed therein. The power supply reinforcement cell 3A connects the ground routings 1s next to each other with the power supply routing 2s interpose therebetween by the reinforce ground routing 1f. The power supply reinforcement cell 3B connects the power supply routings 2s next to each other with the ground routing 1s interposed therebetween by the reinforcing power supply routing 2f. For example, in case that power consumption of a functional circuit formed by a cell column ARi is large, a power supply is fetched from the power supply routing 2s of a neighboring cell column ARh. Thereby, it is possible to cause a current to flow even into the ground routing 1s of a neighboring cell column ARj, and to perform power supply reinforcement on a circuit portion having partially large power consumption.

In this manner, since the power supply reinforcement cells 3A and 3B constitute separate cells disconnected from the functional circuit, a cell for power supply reinforcement is not required to be prepared for each type of functional circuit, and a case does not occur in which the capacity of data for designs remarkably increases due to the power supply reinforcement cell. Further, the power supply reinforcement cells 3A and 3B specify a conductive path that connects the power supply routings 2s located on both sides of one ground routing 1s with the ground routing interposed therebetween, or the ground routings 1s located on both sides of one power supply routing 2s with the power supply routing interposed therebetween, and thus can be applied to power supply reinforcement for the array of the power supply routings having the power supply routing 2s and the ground routing 1s alternately placed in parallel with each other. Further, as obvious from FIG. 11, in case that the power supply reinforcement cells 3A and 3B having a height of 2L are inserted with respect to the array of power supply routings having the power supply routing 2s and the ground routing 1s alternately placed in parallel with each other, it is possible to fetch a power supply voltage VDD or a ground voltage GND across a neighboring functional circuit column. Further, the power supply reinforcement cells 3A and 3B include the well power-feeding regions 20 and 21, and thus are suitable for a case where power supply reinforcement associated with well power-feeding is performed on an empty cell frame having no functional circuit formed therein.

Power Supply Reinforcement Cell Having Height of 2L and No Well Power-Feeding

Figure 12:
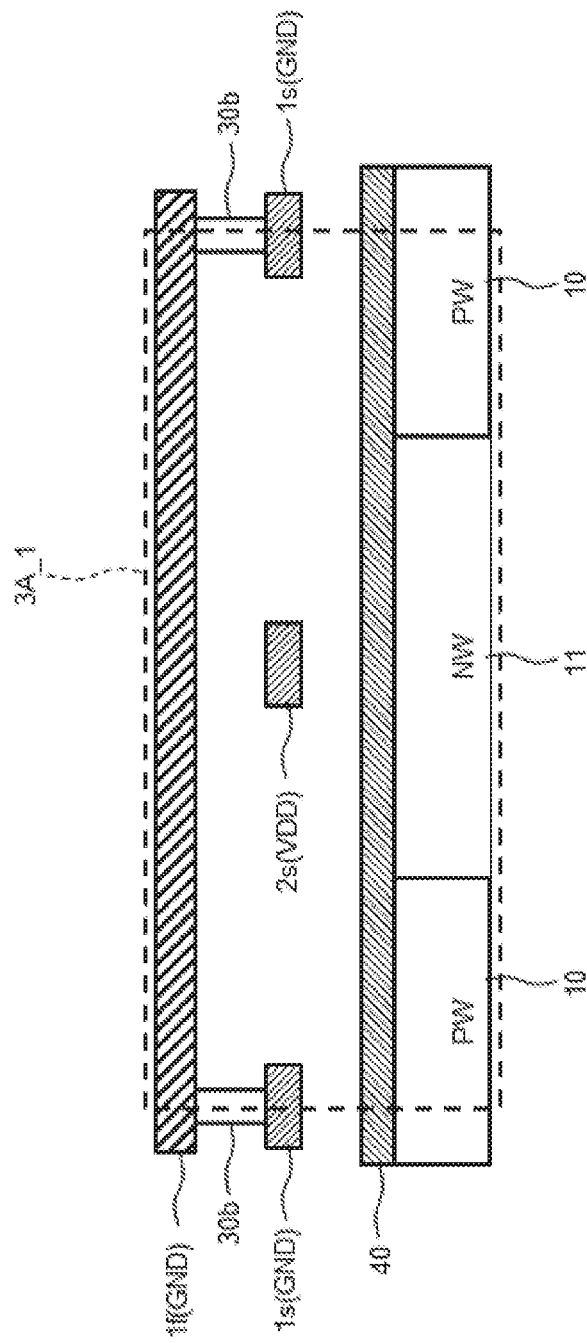
FIG. 12 is a cross-sectional view illustrating a longitudinal cross-sectional configuration of a power supply reinforcement cell for a ground voltage GND having a height of 2L and no well power-feeding.
Figure 13:
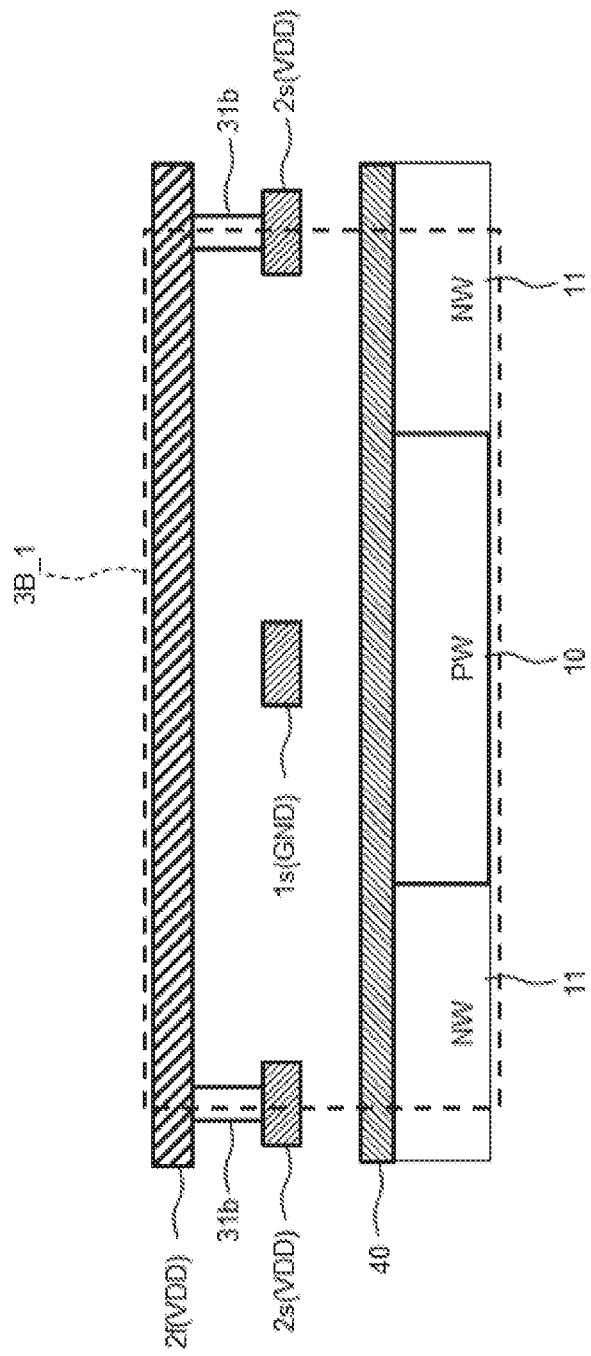
FIG. 13 is a cross-sectional view illustrating a longitudinal cross-sectional configuration of a power supply reinforcement cell for a power supply voltage VDD having a height of 2L and no well power-feeding.

FIGS. 12 and 13 illustrate power supply reinforcement cells 3A_1 and 3B_1 having a height of 2L and no well power-feeding. FIG. 12 illustrates another longitudinal cross-sectional configuration of a power supply reinforcement cell for a ground voltage GND having a height of 2L, and the power supply reinforcement cell 3A_1 shown in the drawing is different from that in FIG. 8, in that the well power-feeding regions 20 and 21 and the vias 30a and 31a are not defined. FIG. 13 illustrates another longitudinal cross-sectional configuration of a power supply reinforcement cell for a power supply voltage VDD having a height of 2L, and the power supply reinforcement cell 3B_1 shown in the drawing is different from that in FIG. 10, in that the well power-feeding regions 20 and 21 and the vias 30a and 31a are not defined. Since the other components are the same as those in FIGS. 8 and 10, the components are denoted by the same reference numerals and signs, and thus the description thereof will not be given.

Such a configuration is suitable for a case where power supply reinforcement is performed by causing the power supply reinforcement cell to overlap a cell frame having the functional circuit formed therein. FIG. 12 is suitable for the power supply reinforcement of a ground voltage GND, and FIG. 13 is suitable for the power supply reinforcement of a power supply voltage VDD.

Power Supply Reinforcement Cell Having Height of L and Well Power-Feeding

The above-described power supply reinforcement cells 3A, 3B, 3A_1, and 3B_1 are configured to be lined up singly and have a size permitting power supply reinforcement. Two power supply reinforcement cells may be lined up back to back without being limited thereto.

Figure 14:
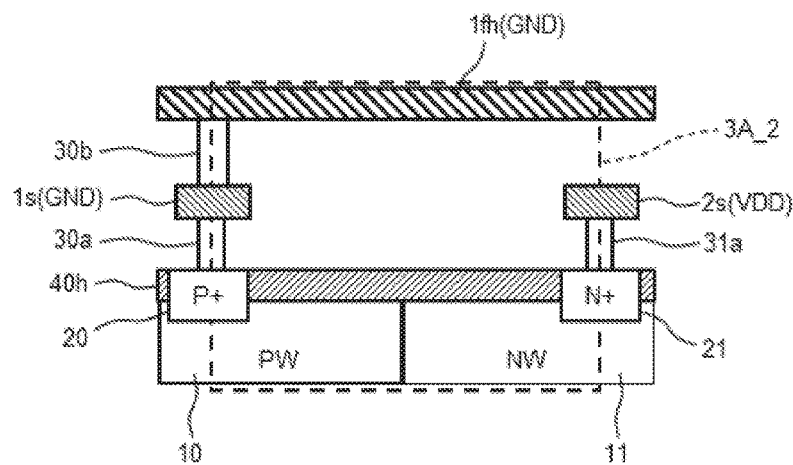
FIG. 14 is a cross-sectional view illustrating a longitudinal cross-sectional structure of a power supply reinforcement cell for a ground voltage GND which has well power-feeding and of which the height is specified as L.
Figure 15:
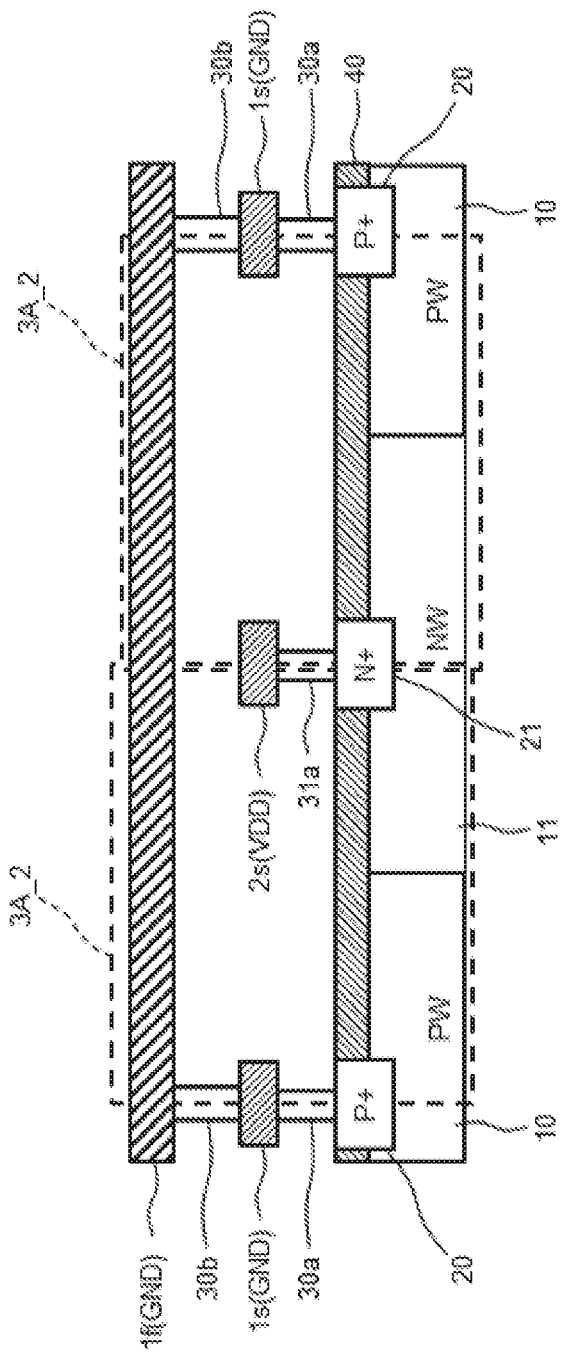
FIG. 15 is a cross-sectional view illustrating a longitudinal cross-sectional structure in which two power supply reinforcement cells of FIG. 14 are placed back to back and are configured to be the same as the power supply reinforcement cell of FIG. 8.

FIG. 14 illustrates a longitudinal cross-sectional structure of a power supply reinforcement cell for a ground voltage GND which has well power-feeding and of which the height is specified as L. FIG. 15 illustrates a longitudinal cross-sectional structure in which two power supply reinforcement cells 3A_2 of FIG. 14 are placed back to back and are configured to be the same as the power supply reinforcement cell 3A of FIG. 8.

Figure 16:
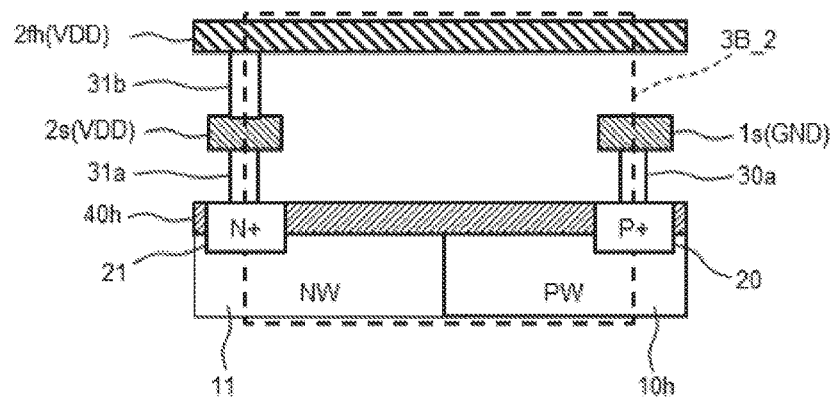
FIG. 16 is a cross-sectional view illustrating a longitudinal cross-sectional structure of a power supply reinforcement cell for a power supply voltage VDD which has well power-feeding and of which the height is specified as L.
Figure 17:
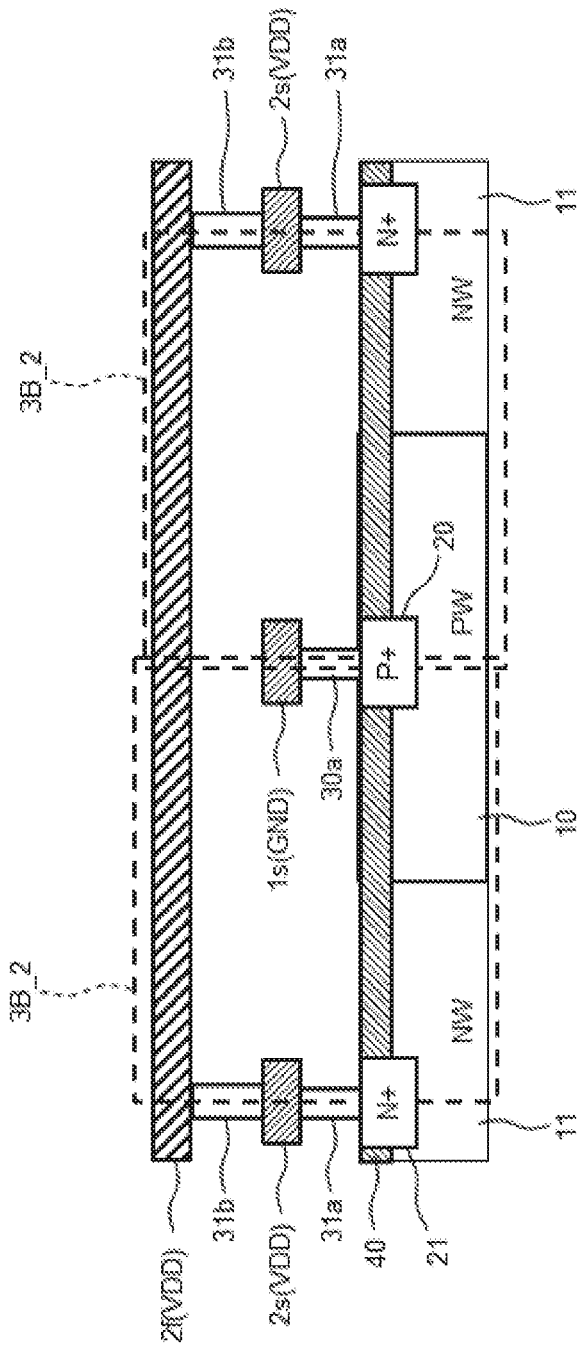
FIG. 17 is a cross-sectional view illustrating a longitudinal cross-sectional structure in which two power supply reinforcement cells of FIG. 16 are placed back to back and are configured to be the same as the power supply reinforcement cell of FIG. 10.

The power supply reinforcement cell 3A_2 of FIG. 14 is configured such that a height equivalent to a distance between the power supply routing 2s and the ground routing 1s which are adjacent to each other is set to L, the cell has a width of 1 pitch similarly to the above, and that line-symmetric placement is performed with two cells used as one set, to thereby specify a conductive path that connects the ground routings is located on both sides of one power supply routing 2s with the power supply routing interposed therebetween, as shown in FIG. 15. Herein, the power supply reinforcement cell 3A_2 includes a power-feeding region 20 provided in the P-type well 10, a via 30a, connected to the power-feeding region 20, which leads to the ground routing 1s, a via 30b standing up on the ground routing 1s in communication with the via 30a, a reinforcing ground routing 1fh connected to the via 30b, a power-feeding region 21 provided in an N-type well 11h, and a via 31a, connected to the power-feeding region 21, which leads to the power supply routing 2s. The N-type well 11h has half the length of the N-type well 11, and 40h means an oxide film having a length of approximately L. Since other components are the same as those in FIG. 8, the components are FIG. 16 illustrates a longitudinal cross-sectional structure of a power supply reinforcement cell for a power supply voltage VDD which has well power-feeding and of which the height is specified as L. FIG. 17 illustrates a longitudinal cross-sectional structure in which two power supply reinforcement cells 3B_2 of FIG. 15 are placed back to back and are configured to be the same as the power supply reinforcement cell 3B of FIG. 10.

The power supply reinforcement cell 3B_2 of FIG. 16 is configured such that a height equivalent to a distance between the power supply routing 2s and the ground routing 1s which are adjacent to each other is set to L, the cell has a width of 1 pitch similarly to the above, and that line-symmetric placement is performed with two cells used as one set, to thereby specify a conductive path that connects the power supply routings 2s located on both sides of one ground routing is with the ground routing interposed therebetween, as shown in FIG. 17. Herein, the power supply reinforcement cell 3B_2 includes a power-feeding region 21 provided in the N-type well 11, a via 31a, connected to the power-feeding region 21, which leads to the power supply routing 2s, a via 31b standing up on the power supply routing 2s in communication with the via 31a, a reinforcing power supply routing 2fh connected to the via 31b, a power-feeding region 20 provided in a P-type well 10h, and a via 30a, connected to the power-feeding region 20, which leads to the ground routing 1s. The P-type well 10h has half the length of the P-type well 10. Since other components are the same as those in FIG. 10, the components are denoted by the same reference numerals and signs, and thus the description thereof will not be given.

According to the power supply reinforcement cells 3A_2 and 3B_2 having a height of L and well power-feeding, the amount of cell data of the power supply reinforcement cell included in the cell library is reduced by half as compared to those in FIGS. 8 and 10, and thus it is possible to obtain the same operational effects as those in the drawings. These reinforcement cells have well power-feeding, and thus are suitable for a case where power supply reinforcement associated with well power-feeding is performed on an empty cell frame having no functional circuit formed therein. The power supply reinforcement cell 3A_2 of FIG. 14 is suitable for the power supply reinforcement of a ground voltage GND, and the power supply reinforcement cell 3B_2 of FIG. 16 is suitable for the power supply reinforcement of a power supply voltage VDD.

Power Supply Reinforcement Cell Having Height of L and No Well Power-Feeding

Figure 18:
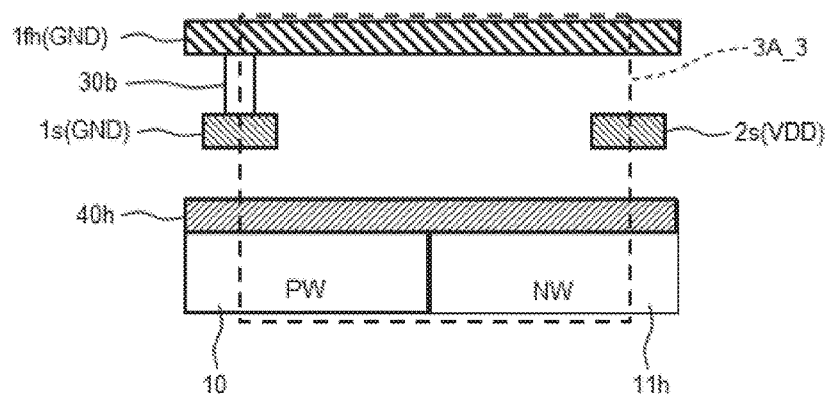
FIG. 18 is a cross-sectional view illustrating a longitudinal cross-sectional configuration of a power supply reinforcement cell for a ground voltage GND which has no well power-feeding and of which the height is specified as L.
Figure 19:
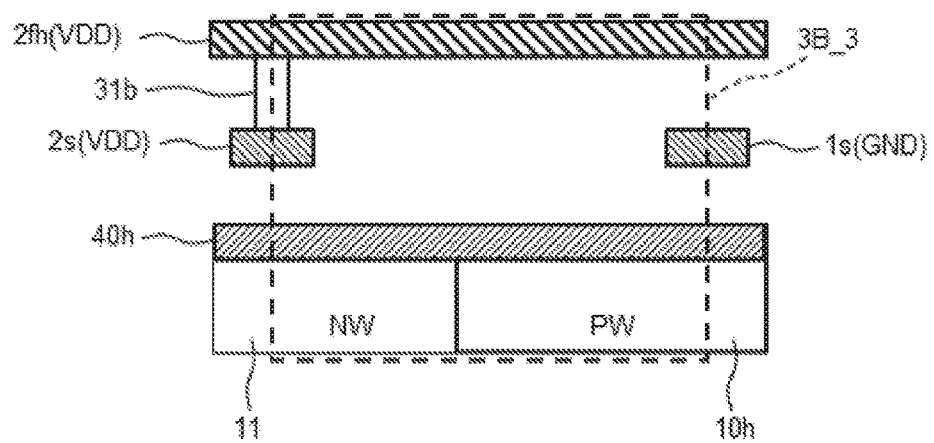
FIG. 19 is a cross-sectional view illustrating a longitudinal cross-sectional configuration of a power supply reinforcement cell for a power supply voltage VDD which has no well power-feeding and of which the height is specified as L.

FIGS. 18 and 19 illustrate power supply reinforcement cells 3A_3 and 3B_3 having a height of L and no well power-feeding. FIG. 18 illustrates a longitudinal cross-sectional configuration of a power supply reinforcement cell for a ground voltage GND which has no well power-feeding and of which the height is specified as L, and the power supply reinforcement cell 3A_3 shown in the drawing is different from that in FIG. 14, in that the well power-feeding regions 20 and 21 and the vias 30a and 31a are not defined. FIG. 19 illustrates a longitudinal cross-sectional configuration of a power supply reinforcement cell for a power supply voltage VDD which has no well power-feeding and of which the height is specified as L, and the power supply reinforcement cell 3B_3 shown in the drawing is different from that in FIG. 16, in that the well power-feeding regions 20 and 21 and the vias 30a and 31a are not defined. Since the other components are the same as those in FIGS. 14 and 16, the components are denoted by the same reference numerals and signs, and thus the description thereof will not be given.

According to the power supply reinforcement cells 3A_3 and 3B_3 having a height of L and no well power-feeding, similarly to the above, the amount of cell data of the power supply reinforcement cell included in the cell library is reduced by half as compared to those in FIGS. 8 and 10, and thus it is possible to obtain operational effect similar thereto. These reinforcement cells have no well power-feeding, and thus are suitable for a case where power supply reinforcement is performed by causing the power supply reinforcement cell to overlap a cell frame in which a functional cell is placed and a functional circuit is formed. The power supply reinforcement cell 3A_3 shown in FIG. 18 is suitable for the power supply reinforcement of a ground voltage GND, and the power supply reinforcement cell 3B_3 shown in FIG. 19 is suitable for the power supply reinforcement of a power supply voltage VDD.

Example of Use of Power Supply Reinforcement Cell

A description will be given of an example in which a power supply reinforcement cell having no well power-feeding and a power supply reinforcement cell having well power-feeding are mixed and used. FIG. 20 shows a state where functional cells are placed by automatic placement and routing. Regions surrounded by broken lines are regions having functional cells 4 placed therein. The element shown by 7 is a signal routing within the functional cell 4, and is formed, although not particularly limited, on the same second aluminum routing layer as a power supply reinforcement routing is formed.

As a result of the automatic placement and routing in FIG. 20, FIG. 21 shows a placement example of power supply reinforcement cells in case that a power supply is fetched from the power supply routing 2s of a neighboring cell column ARh, for example, when the power consumption of a functional circuit formed in a cell column Ari is large, and power supply reinforcement is performed on a circuit portion having partially large power consumption by drawing a current even to the ground routing 1s of a neighboring cell column ARj.

In FIG. 21, the power supply routing 2s of the cell column ARh and the power supply routing 2s of the cell column Ari are connected to each other by the power supply reinforcement cells 3B and 3B_1, and the ground routing 1s of the cell column Ari and the ground routing 1s of the cell column ARj are connected to each other by the power supply reinforcement cell 3A. Functional cells are not placed under the power supply reinforcement cells 3B and 3A, but functional cells are placed under the power supply reinforcement cell 3B_1, and thus the power supply reinforcement cell 3B_1 does not have a well power-feeding function. In case that the power supply reinforcement cells 3B, 3B_1, and 3A are placed, the capability of securing a minimum gap dimension of 8 between other non-connection routings and the signal routings 7 which are adjacent to each other has to be set as placement conditions. An automatic placement and routing tool determines an optimum type and placement of the power supply reinforcement cell, in consideration of conditions of a place in which a power supply is to be reinforced, a minimum gap dimension, or the like.

As described above, while the invention devised by the inventor has been described specifically based on the embodiments thereof, the invention is not limited to embodiments, and it goes without saying that various changes and modifications may be made without departing from the scope of the invention.

For example, the total number of routings of a power supply reinforcement cell and the routing layer of a power supply reinforcement routing can be appropriately changed without being limited to the above embodiments. The routing width of the power supply reinforcement routing may be multiple times the width without being limited to a minimum routing width. The power supply reinforcement cell can be applied to a cell library of various semiconductor integrated circuits such as a microcomputer, a driver, a semiconductor integrated circuit for communication processing or image processing. In FIG. 1, a description has been given of a case where the power supply reinforcement cells 3A and 3B are used, but it goes without saying that the other power supply reinforcement cells 3A_1, 3A_2, 3A_#, 3B_1, 3B_2, and 3B_3 can be applied likewise.

What is claimed is:

1. A computer program product comprising a non-transitory computer-readable storage medium containing code which, when executed by one or more processors, performs an operation for generating a design of a semiconductor device,
wherein the design of the semiconductor device comprises, in a semiconductor substrate:
a plurality of high-potential power supply routings connected to a high-potential power supply trunk, the plurality of high-potential power supply routings separated from each other and placed in parallel with each other; and
a plurality of low-potential power supply routings connected to a low-potential power supply trunk, the plurality of low-potential power supply routings placed alternately and in parallel with the plurality of high-potential power supply routings;
wherein the operation for generating a design of a semiconductor device comprises a predefined automatic placement and routing operation comprising:
accessing, from a predefined cell library, first cell data for one or more functional cells corresponding to one or more functional circuits;
arranging the one or more functional circuits in regions located between the high-potential power supply routings and the low-potential power supply routings;
accessing, from the predefined cell library, second cell data for a power supply reinforcement cell; and
arranging the power supply reinforcement cell to form a conductive path comprising a conductive routing that connects two adjacent first power supply routings of one type of high-potential power supply routings and low-potential power supply routings,
wherein a second power supply routing of the other type of the high-potential power supply routings and the low-potential power supply routings is interposed between the two adjacent first power supply routings.

2. The computer program product according to claim 1, wherein the power supply reinforcement cell has a predetermined width and a predetermined height that is twice a distance between an adjacent high-potential power supply routing and low-potential power supply routing, when seen in a plan view.

3. The computer program product according to claim 2, wherein the power supply reinforcement cell specifies:
a first power-feeding region which is provided in a first well of a first conductivity type,
a first via that leads from the first power-feeding region through connection to a power supply routing of any one polarity within the low-potential power supply routing or the high-potential power supply routing to an upper routing layer thereof,
a second power-feeding region which is provided in a second well of a first conductivity type formed with a well of a second conductivity type next to the first well interposed therebetween,
a second via that leads from the second power-feeding region through connection to a separate power supply routing of the one polarity to an upper routing layer thereof, and
a power supply reinforcement routing of the one polarity which connects the first via and the second via.

4. The computer program product according to claim 3, wherein the first conductivity type is an N-type, the second conductivity type is a P-type, and the power supply routing of the one polarity is a high-potential power supply routing.

5. The computer program product according to claim 3, wherein the first conductivity type is a P-type, the second conductivity type is an N-type, and the power supply routing of the one polarity is a low-potential power supply routing.

6. The computer program product according to claim 2, wherein the power supply reinforcement cell specifies:
a first via, connected to a power supply routing of any one polarity within a low-potential power supply routing or a high-potential power supply routing, which leads to an upper routing layer thereof,
a second via, connected to a neighboring power supply routing of the same polarity as that of the power supply routing having the first via connected thereto, which leads to an upper routing layer thereof, and
a power supply reinforcement routing of the one polarity which connects the first via and the second via.

7. The computer program product according to claim 6, wherein the first conductivity type is an N-type, the second conductivity type is a P-type, and the power supply routing of the one polarity is a high-potential power supply routing.

8. The computer program product according to claim 6, wherein the first conductivity type is a P-type, the second conductivity type is an N-type, and the power supply routing of the one polarity is a low-potential power supply routing.

9. The computer program product according to claim 1, wherein the power supply reinforcement cell has a predetermined width and a predetermined height that is a distance between an adjacent high-potential power supply routing and low-potential power supply routing, when seen in a plan view,
wherein two power supply reinforcement cells are arranged with line-symmetric placement and defined as one set, wherein the set specifies a conductive routing that connects two adjacent first power supply routings of one type of high-potential power supply routings and low-potential power supply routings,
wherein a second power supply routing of the other type of the high-potential power supply routings and the low-potential power supply routings is interposed between the two adjacent power supply routings.

10. The computer program product according to claim 9, wherein the power supply reinforcement cell specifies:
a first power-feeding region which is provided in a first well of a first conductivity type,
a first via that leads from the first power-feeding region through connection to a power supply routing of any one polarity within the low-potential power supply routing or the high-potential power supply routing to an upper routing layer thereof, and
a power supply reinforcement routing of the one polarity which is connected to the first via.

11. The computer program product according to claim 10, wherein the first conductivity type is an N-type, and the power supply routing of the one polarity is a high-potential power supply routing.

12. The computer program product according to claim 10, wherein the first conductivity type is a P-type, and the power supply routing of the one polarity is a low-potential power supply routing.

13. The computer program product according to claim 9, wherein the power supply reinforcement cell specifies:
   a first via, connected to a power supply routing of any one polarity within a low-potential power supply routing or a high-potential power supply routing, which leads to an upper routing layer thereof, and
   a power supply reinforcement routing of the one polarity which is connected to the first via.

14. The computer program product according to claim 13, wherein the first conductivity type is an N-type, and the power supply routing of the one polarity is a high-potential power supply routing.

15. The computer program product according to claim 13, wherein the first conductivity type is a P-type, and the power supply routing of the one polarity is a low-potential power supply routing.

16. A computer program product comprising a non-transitory computer-readable storage medium containing code which, when executed by one or more processors, performs an operation for generating a design of a semiconductor device, wherein the design of the semiconductor device comprises, in a semiconductor substrate:
   a plurality of high-potential power supply routings connected to a high-potential power supply trunk, the plurality of high-potential power supply routings separated from each other and placed in parallel with each other; and
   a plurality of low-potential power supply routings connected to a low-potential power supply trunk, the plurality of low-potential power supply routings placed alternately and in parallel with the plurality of high-potential power supply routings;
   wherein the operation for generating a design of a semiconductor device comprises a predefined automatic placement and routing operation comprising:
      accessing, from a predefined cell library, first cell data for one or more functional cells corresponding to one or more functional circuits;
      arranging the one or more functional circuits in regions located between the high-potential power supply routings and the low-potential power supply routings;
      accessing, from the predefined cell library, second cell data for a power supply reinforcement cell having a predetermined width and a predetermined height that is twice a distance between an adjacent high-potential power supply routing and low-potential power supply routing, when seen in a plan view; and
      arranging the power supply reinforcement cell to form a conductive path that comprises a conductive routing that connects two adjacent first power supply routings of one type of high-potential power supply routings and low-potential power supply routings,
   wherein a second power supply routing of the other type of the high-potential power supply routings and the low-potential power supply routings is interposed between the two adjacent first power supply routings.

17. A semiconductor device comprising:
   a semiconductor substrate comprising:
      a plurality of high-potential power supply routings coupled with a high-potential power supply trunk, wherein the plurality of high-potential power supply routings are separated from each other and are arranged in parallel with each other;
      a plurality of low-potential power supply routings connected to a low-potential power supply trunk, wherein the plurality of low-potential power supply routings are placed alternately and in parallel with the plurality of high-potential power supply routings;
      one or more functional circuits formed in regions located between the high-potential power supply routings and the low-potential power supply routings; and
      at least one power supply reinforcement element specifying a conductive routing that connects two adjacent first power supply routings of one type of high-potential power supply routings and low-potential power supply routings, wherein a second power supply routing of the other type of the high-potential power supply routings and the low-potential power supply routings is interposed between the two adjacent first power supply routings,
   wherein an arrangement of the at least one power supply reinforcement element is determined according to a predefined automatic placement and routing operation in which cell data for the at least one power supply reinforcement element is accessed from a predefined cell library.

18. The semiconductor device of claim 17, wherein the power supply reinforcement element has a predetermined width and a predetermined height that is twice a distance between an adjacent high-potential power supply routing and low-potential power supply routing, when seen in a plan view.

19. The semiconductor device of claim 17, wherein the power supply reinforcement element has a predetermined width and a predetermined height that is a distance between an adjacent high-potential power supply routing and low-potential power supply routing, when seen in a plan view,
   wherein two power supply reinforcement elements are arranged with line-symmetric placement and defined as one set, wherein the set specifies a conductive routing that connects two adjacent first power supply routings of one type of high-potential power supply routings and low-potential power supply routings,
   wherein a second power supply routing of the other type of the high-potential power supply routings and the low-potential power supply routings is interposed between the two adjacent power supply routings.

20. The computer program product of claim 1, wherein accessing the first cell data, arranging the one or more functional circuits, accessing the second cell data, and arranging the power supply reinforcement cell each occur within a first instance of performing the predefined automatic placement and routing operation.

* * * * *